United States Patent Office 3,317,608
Patented May 2, 1967

3,317,608
PROCESS FOR PREPARING 1,2-DIHYDRAZINO-ETHANE
Phyllis D. Oja, Walnut Creek, Calif., assignor to The Dow Chemical Company, Midland, Mich., a corporation of Delaware
No Drawing. Filed June 7, 1962, Ser. No. 202,347
3 Claims. (Cl. 260—583)

This invention relates to novel liquid organic nitrogen compounds useful as a liquid propellant fuel component and more particularly is concerned with novel hydrazinoalkanes and a method for the preparation thereof.

The novel compounds of the present invention comprise hydrazinoalkanes having a chain length of from 2 to about 6 carbon atoms wherein the carbon to hydrazine ratio is one, which compounds correspond to the formula

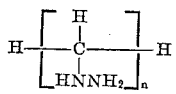

wherein $n$ is an integer ranging from 2 to about 6.

The term monohydrazinoalkanes will be used herein to describe these particular hydrazinoalkanes.

Heretofore the preparation of such monohydrazinoalkanes has not been accomplished using known preparatory procedures since either dialkyl substituted hydrazines, i.e. wherein alkyl groups (R) replaced both of the hydrogen atoms on the same nitrogen atom in the hydrazine molecule, $R_2NNH_2$ (a carbon to hydrazine ratio of at least 2), or wherein three alkyl groups are associated with the same nitrogen atom to form a quaternary ion, $R_3NNH_2$ (a carbon hydrazine ratio of at least 3), are produced.

Now unexpectedly monohydrazinoalkane compounds, as defined hereinbefore, have been prepared in accordance with the instant process. In this process, an alkyl halide having a formula:

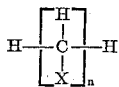

wherein $n$ is an integer ranging from 2 to 6 and preferably from about 2 to 4, and X is halogen, is reacted with an excess of aqueous hydrazine. The ratio of hydrazine, expressed as moles of hydrazine hydrate ($N_2H_4 \cdot H_2O$) per equivalent weight of alkyl halide functional group (C—X) ranges from about 5 to about 120 to 1. Preferably a ratio of from about 7.5 to 10 to 1 is employed.

The ratio of reactants to be employed in the instant process is critical since at hydrazine to functional group ratios (i.e. $N_2H_4 \cdot H_2O/C$—X) below about 5 undesirable polyalkylation becomes marked and the production of desired novel monohydrazinoalkane is almost completely stopped. Ratios of hydrazine to the halogenated hydrocarbon greater than indicated can be employed if desired. However, at higher ratios excessive volumes of reactants and product solutions subsequently complicate handling. Also unduly large equipment must be employed.

The maximum concentration of hydrazine to be employed in the aqueous solution is up to about 80 percent of the solution weight. Ordinarily hydrazine hydrate (64% $N_2H_4$), a constant boiling azeotrope, is used as the hydrazine source.

Anhydrous hydrazine itself is not desired for use in the instant preparation since this material by itself is somewhat dangerous to handle, considerably more expensive than the aqueous solutions and tends to produce hard to control activity in the reaction mix. The minimum concentration of hydrazine solute to be employed in the aqueous hydrazine is not critical, except for the desirability of not having to utilize excessively large quantities of materials as would be encountered with very dilute solutions. Preferably the aqueous hydrazine solution contains from about 40 to about 80 weight percent hydrazine. Hydrazine hydrate is a very satisfactory reactant in that it is a constant boiling azeotrope, is readily obtainable, easily handled and performs very satisfactorily in the instant novel process.

Ordinarily, the chloro substituted hydrocarbon will be used as the organic reactant although either the bromide or iodide derivative can be employed if desired.

The reaction is carried out over a temperature range of from about 5 to about 60° C. and preferably from about 35 to about 40° C.

Reaction times to be employed are those periods whereby the desired quantity of product is obtained and ordinarily are about 12 hours or more. Completion of the reaction is determined by disappearance of the two phase reaction mass and presence of a one phase homogeneous solution. In one test, at a reaction temperature of from about 35 to 40° C. and employing about 30 moles of hydrazine hydrate and 2 moles of dichloroethane substantially complete reaction was obtained in about 16 hours. Advantageously, however, reaction periods of 24 hours or longer can be employed.

For ease in carrying out the process atmospheric pressures are used. However, if desired, either superatmospheric or subatmospheric pressures can be employed.

The reaction between the aqueous hydrazine and the chlorinated hydrocarbon generally is mildly exothermic. Therefore, since the aqueous hydrazine solution and liquid halo organic are substantially immiscible one in the other, reaction temperature can be controlled by controlling the agitation of the reaction mixture. If the temperature becomes too high, agitation of the mix can be either slowed down or stopped whereby the heavier halogenated hydrocarbon separates to the bottom of the reactor and the aqueous hydrazine solution rises to the top of the reactor, thereby reducing the reaction rate and correspondingly reducing the temperature. However, if desired, external heating and cooling can be employed to control the temperature as an aid in carrying out the instant process.

The reaction product readily can be separated from the reaction mixture by removing the excess aqueous hydrazine reactant therefrom. Conveniently, this latter material can be flash distilled from the mixture under reduced pressures and reused in subsequent reactions. The resulting product which may contain some small amounts of unreacted hydrazine along with minor proportions of dialkylated material, cyclic materials and polymeric byproducts can be treated with an inert diluent, for example methanol, that is a solvent for the monohydrazinoalkane product. The residual solids (primarily hydrazine hydrochloride) can be removed by filtering or otherwise separated from the liquid, and the resulting filtrate can be acidified to a pH of about 2 or below with strong mineral acid. Concentrated hydrochloric acid, sulfuric acid, phosphoric acid and the like are suitable for use in the operation. Acids more concentrated than about 6 N are suitable for use in the process. Hydrochloric acid of about 12 N is particularly adapted for the acidification step. This treatment produces the corresponding solid mineral acid salt of the hydrazinoalkane product in relatively pure form along with a very minor amount of residual hydrazine acid salt. The cyclic polymeric and other coproduced contaminants remain in solution. The resulting solid product can be separated from the solution and dissolved in water or other appropriate polar solvents. This solution can then be passed over a basic ion exchange resin to convert the dissolved product to the free base form. The resulting base can be purified, e.g. by distillating, to produce the high purity desired monohydrazinoalkane product.

The process can be carried out in readily available reaction and processing equipment as is apparent to one reasonably skilled in the art. Conveniently, batch type operations are employed although removal of the unreacted aqueous hydrazine reactant from the product mixture can be carried out either in a batch type or continuous distillation apparatus.

The following example will serve to illustrate further the present invention but is not meant to limit it thereto.

*Example*

About fifteen hundred grams (30.0 moles) of hydrazine hydrate was fed into an Erlenmeyer flask equipped with an agitator and a thermometer. To the hydrazine hydrate at 25° C. and atmospheric pressure was added about 194 grams of 1,2-dichloroethane (2.0 moles) and agitation was started. A mechanical stirrer was employed. A mildly exothermic reaction was observed when the immiscible liquids were agitated to allow contact of the two phases. Stirring was continued intermittently for 24 hours. The maximum temperature reached by the mixture was 39° C. Further increase in temperature was prevented by stopping the agitator for short periods of time thus allowing the phases to separate with corresponding control of the reaction rate. The more dense phase (1,2-dichloroethane) slowly dissolved during the course of the reaction.

After the reaction mixture had become completely homogeneous, indicating completion of the reaction, the excess hydrazine hydrate was flash distilled from the mixture under a pressure of approximately 1.77 mm. Hg absolute. The temperature of the reaction mixture was increased from 25° to 60° C. during the distillation. From this distillation 1038 g. of hydrazine hydrate was recovered. There remained a colorless, syrupy, undistilled residue of the 1,2-dihydrazinoethane (ethylene dihydrazine) product along with small amounts of unreacted hydrazine, 1,4-diaminopiperazine and polymeric by-product.

This mixture was slurried with two liters of methanol. The hydrazine hydrochloride, which thus was precipitated, was filtered off. To the methanolic filtrate, concentrated aqueous hydrochloric acid (about 12 Normal) was added until the mixture reached pH 1. The dihydrochloride of ethylene dihydrazine was precipitated by this addition along with the bulk of the hydrazine hydrochloride not removed previously. The diaminopiperazine dihydrochloride, along with the polymeric contaminants, which remained soluble, were removed by filtration. The resulting filter cake, comprising 1,2-dihydrazinoethane dihydrochloride with substantially all of the remainder of the hydrazine (as hydrazine hydrochloride) was dissolved in sufficient water to make a 10% solution by weight of the solute. This solution was passed over a basic ion exchange resin to convert the dissolved salts to their free base form. Distillation of the effluent gave high purity 1,2-dihydrazinoethane in 46% yield, based on the ethylene dichloride fed originally to the reactor.

The 1,2-dihydrazinoethane product was characterized as follows:

*Elemental analysis.*—Found: C, 25.87%; H, 10.99%; N, 63.02%. Calculated for $C_2H_{10}N_4$: C, 26.62%; H, 11.18%; N, 62.20%.

Hydrazine nitrogen determination by iodate titration indicated 63.9% N.

Integration of the C–H and N–H proton N.M.R. scan for ethylene dihydrazine gave very closely the expected 1.5 to 1 ratio of N–H to C–H.

The product was reacted with benzaldehyde to form a colorless tribenzal derivative having a melting point of 139.5–140.0° C.

This derivative upon analysis indicated: C, 77.76%; H, 6.17%; N, 15.24%.

Calculated for $C_{23}H_{22}N_4$, empirical formula for the tribenzal derivative is: C, 78.00%; H, 6.25%; N, 15.80%.

Molecular weight found for the derivative was 362. Theoretical molecular weight is 354.

The 1,2-dihydrazinoethane product was reacted with two equivalents of p-chlorophenyl isocyanate and gave a colorless derivative having a melting point of 208.5–209.0° C. Elemental analysis of the product indicated: C, 48.48%; H, 4.26%; Cl, 17.82%; N, 21.39%; O, 8.05% (by diff.).

Calculated for $C_{16}H_{18}Cl_2N_6O_2$ (formula for the isocyanate derivative): C, 48.40%; H, 4.57%; Cl, 17.84%; N, 21.18%; O, 8.06% (by diff.).

In a manner similar to the foregoing, 1,2,3-trichloropropane can be reacted with an aqueous solution of hydrazine containing 50% hydrazine utilizing a hydrazine (expressed as $N_2H_4 \cdot H_2O$) to chloropropane ratio of 10 to 1 to produce 1,2,3-trihydrazinopropane.

Similarly, 1,2,3,4-tetrabromobutane can be reacted with an aqueous hydrazine solution containing about 70% hydrazine at a mole ratio ($N_2H_4 \cdot H_2O$/chlorobutane) of 25 to 1 to produce the corresponding 1,2,3,4-tetrahydrazinobutane. Likewise, 1-bromo 2-chloro ethane can be reacted with hydrazine hydrate at a mole ratio of 1 to 15 to produce the corresponding 1,2-hydrazinoethane. Also, 1,2-di-iodoethane can be reacted with hydrazine hydrate at a mole ratio of about 1 to 20 to prepare 1,2-dihydrazinoethane. Additionally, 1,2,3,4,5,6-hexahydrazinoethane can be prepared by the instant process.

Various modifications can be made in the present invention without departing from the spirit or scope thereof for it is understood that I limit myself only as defined in the appended claims.

I claim:

1. A process for preparing 1,2-dihydrazinoethane which comprises:
    (1) contacting 1,2-dichloroethane with hydrazine hydrate thereby to prepare a two phase liquid reaction mixture, the molar ratio of said hydrazine hydrate/dichloroethane being about 15 to 1,
    (2) reacting said two phase mixture at a temperature of from about 35 to about 40° C. for a period of time ranging from about 12 to about 24 hours,
    (3) separating the excess hydrazine hydrate from the 1,2-dihydrazinoethane product,
    (4) dissolving the residual reaction product in an excess of an inert solvent for said 1,2-dihydrazinoethane,
    (5) treating the solution of the product in said solvent with a strong mineral acid thereby to produce a solution having a maximum pH of 2 and precipitating the 1,2-dihydrazinoethane product as the corresponding solid acid salt,
    (6) separating the 1,2-dihydrazinoethane acid salt from the acidic solution and dissolving said salt with water,
    (7) converting said dissolved acid salt dihydrazinoethane into the free base form, and
    (8) distilling the regenerated 1,2-dihydrazinoethane free base thereby to produce a high purity 1,2-dihydrazinoethane.

2. The process as defined in claim 1 wherein the strong mineral acid employed is about 12 Normal hydrochloric acid.

3. The process as defined in claim 1 wherein the 1,2-dihydrazinoethane acid salt is passed over a basic ion exchange resin thereby converting it into a free base form.

References Cited by the Examiner

UNITED STATES PATENTS 2,822,354   2/1958   Uraneck et al. _____ 260—84.7

OTHER REFERENCES

Evans: Chemistry and Industry (London), July 19, 1958, pp. 915–916, TP1563.

CHARLES B. PARKER, *Primary Examiner.*

CARL D. QUARFORTH, O. R. VERTIZ, *Examiners.*

L. A. SEBASTIAN, J. W. WHISLER,
*Assistant Examiners.*